United States Patent
Chou

(10) Patent No.: US 10,364,336 B2
(45) Date of Patent: Jul. 30, 2019

(54) THERMOPLASTIC VULCANIZATE COMPOSITION, METHOD OF FORMING THE SAME AND PRODUCT THEREOF

(71) Applicant: FENG TAY ENTERPRISES CO., LTD., Douliu (TW)

(72) Inventor: Chien-Hsin Chou, Douliu (TW)

(73) Assignee: FENG TAY ENTERPRISES CO., LTD., Douliu (TW)

(*) Notice: Subject to any disclaimer, the term of this patent is extended or adjusted under 35 U.S.C. 154(b) by 64 days.

(21) Appl. No.: 15/713,084

(22) Filed: Sep. 22, 2017

(65) Prior Publication Data
US 2019/0092922 A1 Mar. 28, 2019

(51) Int. Cl.
| | |
|---|---|
| *C08K 5/00* | (2006.01) |
| *C08K 5/435* | (2006.01) |
| *C08K 5/372* | (2006.01) |
| *C08K 5/47* | (2006.01) |
| *C08L 9/02* | (2006.01) |
| *C08L 9/06* | (2006.01) |
| *C08L 23/14* | (2006.01) |
| *B01J 19/18* | (2006.01) |
| *C08L 47/00* | (2006.01) |

(52) U.S. Cl.
CPC ............ *C08K 5/0025* (2013.01); *C08K 5/372* (2013.01); *C08K 5/435* (2013.01); *C08K 5/47* (2013.01); *C08L 9/02* (2013.01); *C08L 9/06* (2013.01); *C08L 23/142* (2013.01); *B01J 19/18* (2013.01); *C08K 5/0016* (2013.01); *C08L 47/00* (2013.01)

(58) Field of Classification Search
CPC .......... C08L 75/00; C08L 75/04; C08L 75/06; C08L 75/08; C08L 75/10; C08L 75/12; C08L 75/14; C08L 75/16
See application file for complete search history.

(56) References Cited

U.S. PATENT DOCUMENTS 6,207,752 B1 3/2001 Abraham et al.

FOREIGN PATENT DOCUMENTS

| CN | 1368991 A | 9/2002 | |
|---|---|---|---|
| CN | 102153853 A | 8/2011 | |
| WO | 0034383 A1 | 6/2000 | |
| WO | 0110950 A1 | 2/2001 | |
| WO | 2009017868 A1 | 2/2009 | |
| WO | 2016023914 A1 | 2/2016 | |
| WO | WO-2016023914 A1 * | 2/2016 | ............. C08G 77/12 |

OTHER PUBLICATIONS

Pearlthane 11T85 datahsheet, download Jan. 20, 2019 (Year: 2019).*
European Search Report for EP17191737, Total of 8 pages, dated Mar. 5, 2018.
Examination Report for TW106122428, dated Dec. 29, 2017, Total of 6 pages.
Search Report for TW106122428, dated Dec. 28, 2017, Total of 1 page.
English Abstract for corresponding document WO0110950 (A1), Total of 1 page.
English Abstract for CN102153853 (A), Total of 1 page.

* cited by examiner

*Primary Examiner* — Christopher M Rodd
(74) *Attorney, Agent, or Firm* — Lynette Wylie; Apex Juris, pllc.

(57) ABSTRACT

A thermoplastic vulcanizate composition, a method for forming a thermoplastic vulcanizate with the composition and a product thereof are disclosed. The thermoplastic vulcanizate composition includes a thermoplastic polyurethane, a rubber, a vulcanizing agent for crosslinking the rubber, and an additive. Wherein, a hardness of the thermoplastic polyurethane is at least 19A greater than a hardness of the rubber, and the hardness of the thermoplastic polyurethane is equal to or greater than 70A. A weight ratio of the thermoplastic polyurethane to the rubber is from 30:70 to 70:30. The crosslinked rubber is dispersed in a continuous phase constituted by the thermoplastic polyurethane.

3 Claims, No Drawings

THERMOPLASTIC VULCANIZATE COMPOSITION, METHOD OF FORMING THE SAME AND PRODUCT THEREOF

BACKGROUND OF THE INVENTION

1. Technical Field

The present invention is related to a thermoplastic vulcanizate; more particularly to a thermoplastic vulcanizate composition, a method of forming the thermoplastic vulcanizate including the composition and a product thereof.

2. Description of Related Art

General requirements for soles of sports shoes, usually include good performance in elasticity, hardness, abrasion resistance, impact resistance and grip. Common materials for the sports shoes include rubber, polyurethane (PU) and ethylene/vinyl acetate copolymer (EVA), etc. Among them, the rubber is the most popular material for forming the outsole of the shoes since the rubber has excellent grip, elasticity, and elongation. However, the rubber outsole includes some drawbacks, such as heavy weight and high manufacturing cost. Moreover, the rubber outsole has a poor ozone resistance. The ozone molecules included in the environment easily react with the carbon-carbon double bonds of the rubber material and result in breaking of the carbon chains of the rubber. Hence, the elasticity of the rubber is weakened and cracking of the rubber products occurs. However, there is usually small amounts of ozone in the air, especially in the rainy days, or around a laser printer. The ozone molecules always gradually degrade the rubber products.

A material having elasticity similar to rubber, thermoplastic polyurethane (TPU), is a plastic material that has been gradually taken seriously because of its excellent mechanical strength, good elasticity, abrasion resistance and aging resistance, and has been adopted to replace PVC (polyvinyl chloride) in many products. TPU is a multi-block copolymer consisting of alternating sequences of hard and soft segments. TPU can be formed from diisocyanate (including Diphenylmethane Diisocyanate (MDI) and Toluene Diisocyanate (TDI)), high molecular weight polyols (including polyester, polyol and polycarbonate) which constitute soft segments in the PU chains, and small molecular weight polyols (including aliphatic diols and aromatic diols) which constitute hard segments in the PU chains. Since TPU both contains soft segments and hard segments, a hardness thereof can be adjusted by changing its composition. Hence, TPU can have a wide range of hardness. TPU has excellent tensile resistance, elongation, abrasion resistance and tear resistance. Moreover, TPU has good aging resistance. In addition, TPU is a thermoplastic material and has good processing characteristic. TPU can be applied to multiple kinds of processing methods, such as extrusion, calendaring, kneading and injection-molding, for manufacturing products. All of TPU products are recyclable and meet the requirement for environmental protection. However, TPU has a poor grip and is not suitable for forming shoe outsoles.

To improve the grip of TPU, a melt-blending process of rubber and thermoplastic polymers was used in the conventional arts. For example, TPU and ethylene-propylene-diene monomer (EPDM) are mixed together to increase the tensile strength of TPU. Besides, by adding EPDM into TPU, the temperature influence on TPU processing can be minimized Dynamic vulcanization is another method for improving the physical properties of TPU. Dynamic vulcanization includes vulcanizing rubber during the melt-blending process of thermoplastic polymers and rubbers. During the dynamic vulcanization process, the crosslinked rubbers can be uniformly dispersed in the continuous phase of thermoplastic polymers, such as TPU. Thermoplastic vulcanizate (TPV) can be obtained after the dynamic vulcanization process of TPU and rubber. Since TPV is composed of rubber and thermoplastic polymers, TPV can have both of the good performance and characteristic of rubber and thermoplastic polymers.

Referring to WO 2001010950A1, a method of forming TPV by dynamic vulcanization of TPU and Isoprene rubber/Ethylene Propylene Rubber (EPDM) had been disclosed. In the disclosure of WO 2001010950A1, different additives are utilized to improve the characteristic of TPV. However, it does not disclose an optimum composition of TPU and rubber for forming TPV.

BRIEF SUMMARY OF THE INVENTION

In view of the above, the present invention is to provide a thermoplastic vulcanizate composition and a method for forming the same which can be adapted to form a thermoplastic vulcanizate having good performance in mechanical strength, abrasion resistance, grip, and ozone resistance.

According to an embodiment of the present invention, a thermoplastic vulcanizate composition includes a thermoplastic polyurethane, a rubber, a crosslinking agent for chemically crosslinking the rubber, and an additive. Wherein, a hardness of the thermoplastic polyurethane is at least 19A greater than that of the rubber; a hardness of the thermoplastic polyurethane is equal to or greater than 70A; a weight ratio of the thermoplastic polyurethane to the rubber is between 30:70 and 70:30; and the crosslinked rubber is dispersed in a continuous phase constituted by the thermoplastic polyurethane.

According to an embodiment of the present invention, a thermoplastic vulcanizate product includes a thermoplastic vulcanizate made of the composition mentioned above.

According to an embodiment of the present invention, a method for forming a thermoplastic vulcanizate includes steps of selecting a thermoplastic polyurethane; selecting a rubber, wherein a hardness of the thermoplastic polyurethane is 19A greater than that of the rubber; a hardness of the thermoplastic polyurethane is equal to or greater than 70A, and a weight ratio of the thermoplastic polyurethane to the rubber is between 30:70 and 70:30; and mixing the thermoplastic polyurethane and the rubber in a dynamic vulcanization process.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Method for Producing Thermoplastic Vulcanizate

The method of producing thermoplastic vulcanizate according to the present invention includes melt blending rubber and thermoplastic polyurethane, followed by dynamically vulcanizing this blend to form crosslinked rubber dispersed in the thermoplastic polyurethane. The thermoplastic vulcanizate composition contains thermoplastic polyurethane as a continuous phase. In the embodiments of the present invention, several kinds of rubbers and thermoplastic polyurethanes which have hardness of different values are utilized in the dynamic vulcanization process to produce the thermoplastic vulcanizate. The physical properties of the thermoplastic vulcanizate obtained from different combinations of rubber and thermoplastic polyurethane are then analyzed in the following process.

The method for producing the thermoplastic vulcanizate mainly includes two steps. In the first step, a rubber mixing process is performed. First, additives are well-mixed with the rubber to increase the physical and mechanical properties of the rubber. In this step, a first mixture is obtained. Wherein, the rubber and the additives can be mixed in a kneader such as a kneader mixer, or in a closed-type mixer, such as a Banbury mixer. During the mixing process, shearing of the rubber generates shearing stress and the temperature of the rubber mixture would be gradually increased. The mixing process includes mixing the rubber and the additives for at least 5 minutes, and taking out the first mixture before the temperature of the first mixture increasing to 110° C. Next, the first mixture is cooled down by being fed into a two-roll mill and rolled down between the two rollers as a thin rubber sheet for at least three times. Then, a vulcanizing agent and an accelerator are added into the two-roll mill and are well-mixed with the first mixture to form a second mixture. In this embodiment, the rubber mixing process is performed with a kneader mixer or a Banbury mixer. However, it is not limited thereto. In other embodiments, a twin screw extruder also can be utilized to proceed the rubber mixing process.

The second step is a dynamic vulcanization process of the rubber mixture. The second mixture obtain from the rubber mixing process is mixed with a thermoplastic polyurethane to form a third mixture. Then, the third mixture is heated to crosslink the rubber at a high temperature to form a thermoplastic vulcanizate having crosslinked rubber be uniformly dispersed in the thermoplastic polyurethane. A weight ratio of the thermoplastic polyurethane to the rubber is between 30:70 and 70:30. Preferably, the weight ratio of the thermoplastic polyurethane to the rubber is 60:40. In the dynamic vulcanization process, the thermoplastic polyurethane can either be heated or not be heated before adding into the second mixture. That is, the thermoplastic polyurethane can be mixed with the second mixture directly as well as be heated to about 50° C. and then be mixed with the second mixture. Wherein, when the thermoplastic polyurethane and the second mixture are mixed in a batch-type reactor, such as a kneader mixer or a Banbury mixer, a reaction temperature of the dynamic vulcanization process is at least 145° C. and a reaction time thereof is at least 3 minutes. Meanwhile, when the thermoplastic polyurethane and the second mixture are mixed in a continuous-type reactor, such as a twin screw extruder, preferably, the reaction temperature of the dynamic vulcanization process is at least 195° C. and the reaction time thereof is at least 15 seconds.

In the second step, in the rubber cross-linking process, a rheometer can be utilized to measure a torque response of the thermoplastic vulcanizate. When the torque measured by the rheometer reaches a maximum value, the crosslink reaction of the rubber is completed.

In this embodiment, the rubber includes natural rubber (NR), polybutadiene rubber (BR), nitrile butadiene rubber (NBR), bromo isobutylene isoprene rubber (BIIR), polyisoprene rubber (IR), styrene-butadiene rubber (SBR), isobutylene isoprene rubber (IIR), ethylene-propylene rubber (EPR) and ethylene propylene diene polymethylene (EPDM). However, it is not limited thereto. Preferably, in this embodiment, a hardness of the rubber is between 25A to 75A.

In this embodiment, different combinations of BR, NR, BIIR and additives are mixed together to prepare several kinds of rubbers having different hardness. As shown in Table 1, the rubbers and the additives used in the first step are listed therein. A weight unit "phr" of the additives shown in the table is parts per hundred of rubber. For example, 1 gram of NS is added into per hundred gram of rubber. After the rubber mixing process, the rubbers A, B, C, D, E and F which have different hardness are obtained. Wherein, the rubbers A, B, C, D, E and F are used in the second step of dynamic vulcanization process. The hardness of the rubbers A, B, C, D, E and F is between 25A to 85A.

In this embodiment, the thermoplastic polyurethanes having hardness between 55A to 60D are utilized. The thermoplastic polyurethane includes polyester-based thermoplastic polyurethanes from Hwa Pao Resins. As shown in Table 2, the brand names of the thermoplastic polyurethanes are IF70A, IF80A, I45D, I60D and RD, respectively. Wherein, "RD" is an experimental type of thermoplastic polyurethane from Hwa Pao Resins. The thermoplastic polyurethanes utilized in this embodiment are purchased from Hwa Pao Resins. However, other types of thermoplastic polyurethane also can be utilized.

TABLE 1

| Brand name | Weight (Kg) | | | | | |
| --- | --- | --- | --- | --- | --- | --- |
| | Rubber A | Rubber B | Rubber C | Rubber D | Rubber E | Rubber F |
| BR | 30 | 50 | 50 | 70 | 80 | 100 |
| NR | 0 | 0 | 50 | 30 | 20 | 0 |
| BIIR | 70 | 50 | 0 | 0 | 0 | 0 |
| 60NS | 1 | 1 | 1 | 1 | 1 | 1 |
| ZnO | 3 | 3 | 3 | 3 | 3 | 3 |
| VN3 | 0 | 10 | 30 | 50 | 60 | 60 |
| Silane | 1 | 1 | 1 | 1 | 1 | 1 |
| BHT | 1 | 1 | 1 | 1 | 1 | 1 |
| STAC | 1 | 1 | 1 | 1 | 1 | 1 |
| 1956 | 1 | 1 | 1 | 1 | 1 | 1 |
| PEG | 3 | 3 | 3 | 3 | 3 | 3 |
| M1943 | 5 | 5 | 5 | 5 | 5 | 5 |
| RT1987 | 1 | 1 | 1 | 1 | 1 | 1 |
| SU135-70 | 2.5 | 2.5 | 2.5 | 2.5 | 2.5 | 2.5 |
| MBTS-75 | 1 | 1 | 1 | 1 | 1 | 1 |
| TBZTD | 0.3 | 0.3 | 0.3 | 0.3 | 0.3 | 0.3 |
| Hardness | 25A | 35A | 51A | 65A | 74A | 85A |

TABLE 2

| TPU Brand Name | RD | IF70A | IF80A | I45D | I60D |
| --- | --- | --- | --- | --- | --- |
| TPU Hardness | 55A | 70A | 80A | 45D | 60D |

In this embodiment, the additives include, but are not limited to: (1) homogenizing agent, including aliphatic hydrocarbon resin mixtures, such as homogenizing agent 60NS from Struktol (Germany), wherein the homogenizing agent can improve the mixing homogenization of rubbers which have different polarity and viscosity; (2) catalyst, including zinc oxide (ZnO); (3) reinforcing agent, including VN3 from Evonik United Silica Ind. Ltd., wherein the reinforcing agent has high specific surface area and high purity, and can increase hardness and wear resistance of rubbers; (4) surfactant, including silane, steartrimonium chloride (STAC), polyethylene glycol (PEG), M1943 (compatibilizer) from Asahi Kasei Corporation, and RT 1987

(auxiliary agent) from Rhein Chemie (Germany); (5) antioxidant, including butylated hydroxytoluene (BHT), wherein BHT can improve the resistance to oxidation of rubbers; and (6) anti-fogging agent, including the anti-fogging agent 1956 from Guangzhou Longsun Technology Co. (China).

Vulcanizing agent, includes but is not limited to: sulfur, metal oxide and phenol resin.

Accelerator, includes but is not limited to: dibenzothiazole Disulfide (MBTS), tetrabenzylthiuramdisulfide (TBZT), and sulfur SU135 from Struktol (Germany).

Test Method for Determining Physical Property

In the embodiments of the present invention, the physical properties of rubber, thermoplastic polyurethane and thermoplastic vulcanizate were determined based on the following methods:

Hardness (unit: Shore A):
Hardness was determined according to ASTM 2240;
Tensile strength (unit: $N/mm^2$):
Tensile strength was determined according to DIN 53504;
Tear resistance (unit: N/mm):
Tear resistance was determined according to DIN 53507-A;
Elongation (unit: %):
Elongation was determined according to DIN 53504;
Abrasion resistance (unit: $mm^3$)
Abrasion resistance was determined according to DIN 53516/DIN 53479;
Ozone resistance (Standard: Pass/Fail)
Ozone resistance was determined according to ASTM D 1149;
Dry/wet grip (unit: lb):
According to a Homemade PS1 testing method, which includes the following steps:
Preparing a test specimen of a length of 60 mm, a width of 30 mm and a thickness of 6 mm; forming a hole, of a diameter of 2 mm, distant from an edge of the width side of 5 mm and at a center portion of the width side of the test specimen; tying a sewing thread with a length of 80 mm to the hole of the test specimen; putting a steel plate of a weight of 938 g (the steel plate has a length of 80 mm, a width of 50 mm and a thickness of 10 mm) on the test specimen, and pulling the test specimen with a portable tension scale via the sewing thread to get the maximum value, wherein a dry grip is tested under a condition that the test specimen is positioned on a dry marble surface, while a wet grip is tested under a condition that the test specimen is positioned on a water-splashed marble surface.

Embodiments

The methods of making thermoplastic vulcanizates for experiments 1 to 12 are described as follows:

Experiment 1

The rubber was prepared according to the method for preparing rubbers as mentioned above. In Experiment 1, a rubber having a hardness of 25A (rubber A) and a thermoplastic polyurethane having a hardness of 55A were used. Wherein, a weight ratio of the thermoplastic polyurethane to the rubber is 60:40.

First, the rubber was well mixed with sulfur and the accelerator. As described above, the mixing method includes the following steps. The compositions of rubber A, i.e., BR, BIIR and the additives were mixed with a kneader or a Banbury mixer. Next, the rubber mixture was taken out before the temperature of the rubber mixture reached 110° C. and was cooled down with a two-roll mill through being rolled down between the two rollers as a thin rubber sheet for at least three times. Then, sulfur and the accelerator were added into the rubber mixture and were well mixed with the rubber mixture.

Thereafter, the thermoplastic polyurethane was softened by heating to 50° C. The softened thermoplastic polyurethane was then added into the rubber mixture to be mixed and reacted with the rubber mixture. In other embodiments, the thermoplastic polyurethane can also be added into the rubber mixture directly without per-heating and be mixed with the rubber mixture. The mixing and reaction process can be proceeded in a kneader, a Banbury mixer or a twin screw extruder. Wherein, when the reaction is proceeded with a batch-type reactor, such as a kneader mixer or a Banbury mixer, a reaction temperature of the dynamic vulcanization process is at least 145° C. and a reaction time thereof is at least 3 minutes so as to achieve a complete reaction of the rubber mixture. Meanwhile, when the reaction is proceeded with a continuous-type reactor, such as a twin screw extruder, the reaction temperature of the dynamic vulcanization process is at least 190° C. and the reaction time thereof is at least 15 seconds, preferably. Then, a rheometer was utilized to measure a torque response of the thermoplastic vulcanizate. When the torque measured by the rheometer reached a maximum value, the crosslink reaction of the rubber was completed. Then, the obtained thermoplastic vulcanizate was prepared as a test specimen.

Experiment 2 to Experiment 12

The hardness of the rubbers and the thermoplastic polyurethane used in Experiment 2 to Experiment 12 was listed in Table 3. The reaction conditions of Experiment 2 to Experiment 12 were the same as the reaction condition of Experiment 1.

Comparative Experiment

A test specimen for a comparative experiment was prepared with a vulcanized rubber having a hardness of 65A. The physical properties of the test specimen of the comparative experiment were compared with the physical properties of Experiment 1 to Experiment 12.

In the experiments of the present invention, the weight ratio of the thermoplastic polyurethane to the rubber is 60:40. However, it is not limited thereto. In other embodiments, other weight ratios of the thermoplastic polyurethane to the rubber can be used to prepare thermoplastic vulcanizates.

Referring to Table 4, the experimental results of Experiment 1 to Experiment 12 are listed in the table. The experimental results are related to the physical properties obtained from each of the test specimen according to the test method mentioned above.

As shown in Table 3 and Table 4, the thermoplastic vulcanizates obtained from Experiment 2 to Experiment 12 have better physical properties as comparing to the thermoplastic vulcanizate of Experiment 1 and the rubber of the comparative experiment. Wherein, as comparing the physical properties of the thermoplastic vulcanizates of Experiment 2 (TPV hardness of 66A), Experiment 4 (TPV hardness of 66A) and Experiment 7 (TPV hardness of 65A), it is found that even the hardness of the thermoplastic vulcanizates obtained from the three experiments is closed to each other, however, the physical properties of the thermoplastic vulcanizates of Experiment 2 and Experiment 7 are better than that of Experiment 2. That is, the physical properties, such as tensile strength, tear resistance and abrasion resistance, of the thermoplastic vulcanizates of Experiment 4 and Experiment 7 are better than those of the thermoplastic vulcanizate of Experiment 2. The differences between the hardness of the thermoplastic polyurethane and the rubber in Experiment 4 and Experiment 7 are respectively 5A and 29A, while in Experiment 2, the difference between the hardness of the thermoplastic polyurethane and the rubber is −19A. In this embodiment, the thermoplastic polyurethane constitutes the continuous phase of the thermoplastic vulcanizate and the rubber constitutes the disperse phase of the thermoplastic vulcanizate. From the results of the above experiments, it is found that when a hardness of the thermoplastic polyurethane which constitutes the continuous phase is greater than that of the rubber which constitutes a disperse phase, a better physical property can be obtained.

In addition, even the hardness of the thermoplastic vulcanizate of Experiment 7 (65A) is smaller than that of Experiment 2 and Experiment 4 (66A), the tensile strength and the tear resistance of the thermoplastic vulcanizate of Experiment 7 are greater than those of Experiment 2 and Experiment 4. It is found that the greater the hardness difference between the thermoplastic polyurethane and the rubber, a thermoplastic vulcanizate with better physical properties can be obtained, even that the hardness of the obtained products are close to each other.

In Experiment 8 to Experiment 11, the thermoplastic polyurethanes having hardness greater than 80A are used with rubbers having different hardness to form thermoplastic vulcanizates. From the results of Experiment 8 to Experiment 11, it is found that when a difference between the thermoplastic polyurethane and the rubber is −5A to 15A, the grip of the obtained thermoplastic vulcanizate decreases. Besides, in Experiment 3, the thermoplastic polyurethane has a hardness of 70A and the rubber has a hardness of 51A were used to form the thermoplastic vulcanizate.

Referring to the testing results of Experiment 3, it can be found that when a hardness difference between the thermoplastic polyurethane and the rubber is greater than 19A, the obtained thermoplastic vulcanizate still can have good grip, tensile strength and tear resistance. From the above results, it is found that it is better to use a combination of thermoplastic polyurethane and rubber having a hardness difference which is greater than 19A to obtain a thermoplastic vulcanizate with better physical properties.

Referring to Table 4, it can be found that when the hardness of the thermoplastic vulcanizate is between 50A and 70A, a dry grip of the thermoplastic vulcanizate can be greater than 2 lb. Hence, to obtain a better dry grip, it is better to produce a thermoplastic vulcanizate having a hardness of 50A to 70A. Moreover, to obtain a product having better dry grip, tensile strength and tear resistance, it is better to produce a thermoplastic polyurethane of 60A to 70A.

The thermoplastic vulcanizates obtained from the method of the embodiment according to the present invention, a tensile strength thereof is greater than 8.6 N/mm$^2$; particularly, in some experiments, a tensile strength thereof can be greater than 13.8 N/mm$^2$; a tear resistance thereof can be greater than 10.8 N/mm; particularly, in some experiments, a tear resistance thereof can be greater than 13.6 N/mm; an elongation thereof can be greater than 345%; particularly, in some experiments, an elongation thereof can be greater than 560%; an abrasion resistance thereof can be smaller than 156 mm$^3$; particularly, in some experiments, an abrasion resistance thereof can be smaller than 45 mm$^3$; a dry grip thereof can be greater than 2.85 lb; particularly, in some experiments, a dry grip thereof can be greater than 3.18 lb; a wet grip thereof can be greater than 0.64 lb; particularly, in some experiments, a wet grip thereof can be greater than 0.88 lb. Moreover, the thermoplastic vulcanizates obtained from the above experiments all have a better ozone resistance and can pass ozone test.

On the contrary, the rubber used in the comparative experiment is the rubber material which is widely used for manufacturing shoe outsoles. Referring to the result of the comparative experiment shown in Table 4, even the rubber has a good performance in tensile strength and elongation, the rubber cannot pass ozone test.

In addition, the thermoplastic vulcanizate is injection moldable and can be utilized to manufacture a plurality of products, such as midsole or outsole of sport shoes. Moreover, the products made of the thermoplastic vulcanizate can be recycled and can meet the requirement for environmental protection.

It must be pointed out that the embodiments described above are only some embodiments of the present invention. All equivalent structures which employ the concepts disclosed in this specification and the appended claims should fall within the scope of the present invention.

TABLE 3

| Experiment | TPU Hardness | Rubber Hardness | Hardness difference between TPU and Rubber | TPV hardness |
|---|---|---|---|---|
| 1 | 55A | 25A | 30A | 39A |
| 2 | 55A | 74A | −19A | 66A |
| 3 | 70A | 51A | 19A | 60A |
| 4 | 70A | 65A | 5A | 66A |
| 5 | 80A | 25A | 55A | 50A |
| 6 | 80A | 35A | 45A | 56A |
| 7 | 80A | 51A | 29A | 65A |
| 8 | 80A | 65A | 15A | 72A |
| 9 | 80A | 74A | 6A | 77A |
| 10 | 80A | 85A | −5A | 82A |
| 11 | 45D | 35A | >20A | 66A |
| 12 | 60D | 85A | <20A | 92A |

TABLE 4

| Test specimen | Experiment | | | | | | | | | | | | Comparative Experiment Rubber |
|---|---|---|---|---|---|---|---|---|---|---|---|---|---|
| | 1 | 2 | 3 | 4 | 5 | 6 | 7 | 8 | 9 | 10 | 11 | 12 | |
| | | | | | | TPV | | | | | | | |
| Hardness (shore A) | 39 | 66 | 60 | 66 | 50 | 56 | 65 | 72 | 77 | 82 | 66 | 92 | 65 |
| Tensile strength (N/mm$^2$) | 7.3 | 11.2 | 10.5 | 12.4 | 8.6 | 9.3 | 13.8 | 15.7 | 16.2 | 13.2 | 14.4 | 16.1 | 16.2 |

TABLE 4-continued

| Test specimen | Experiment | | | | | | | | | | | | Comparative Experiment Rubber |
|---|---|---|---|---|---|---|---|---|---|---|---|---|---|
| | 1 | 2 | 3 | 4 | 5 | 6 | 7 | 8 | 9 | 10 | 11 | 12 | |
| | | | | | | TPV | | | | | | | |
| Tear resistance (N/mm) | 8.1 | 12.5 | 12.6 | 12.5 | 10.8 | 11.7 | 14.7 | 13.5 | 12.5 | 10.3 | 13.6 | 10.7 | 14.7 |
| Elongation (%) | 690 | 588 | 602 | 581 | 655 | 632 | 560 | 432 | 355 | 288 | 345 | 156 | 345 |
| Abrasion resistance (mm$^3$) | 221 | 77 | 102 | 65 | 115 | 156 | 45 | 56 | 55 | 82 | 35 | 89 | 78 |
| Dry grip (lb) | 4.12 | 3.14 | 3.55 | 3.12 | 3.66 | 3.65 | 3.18 | 1.99 | 1.85 | 1.77 | 2.85 | 1.87 | 2.89 |
| Wet grip (lb) | 0.99 | 0.84 | 0.87 | 0.82 | 0.96 | 0.93 | 0.88 | 0.69 | 0.66 | 0.64 | 0.64 | 0.62 | 0.82 |
| Ozone resistance | PASS | PASS | PASS | PASS | PASS | PASS | PASS | PASS | PASS | PASS | PASS | PASS | FAIL |

What is claimed is:

1. A method for forming a thermoplastic vulcanizate, comprising:
   selecting a thermoplastic polyurethane;
   selecting a rubber, wherein a hardness of the thermoplastic polyurethane is 19A greater than that of the rubber; a hardness of the thermoplastic polyurethane is equal to or greater than 70A, and a weight ratio of the thermoplastic polyurethane to the rubber is between 30:70 and 70:30; and
   mixing the thermoplastic polyurethane and the rubber in a dynamic vulcanization process, comprising:
      forming a first mixture, wherein the first mixture comprises the rubber and an additive;
      forming a second mixture, wherein the second mixture comprises a vulcanizing agent, an accelerator and the first mixture; and
      forming a third mixture, wherein the third mixture comprise the thermoplastic polyurethane and the second mixture; and the step of forming the third mixture comprises a reaction process in a batch-type reactor at a temperature higher than 145° C. for at least 3 minutes or in a continuous-type reactor at a temperature higher than 190° C. for at least 15 seconds.

2. The method of claim 1, wherein the step of forming the third mixture comprises a step of heating the thermoplastic polyurethane to 50° C. and then adding the thermoplastic polyurethane into the second mixture after heating.

3. The method of claim 1, wherein the steps of forming the first mixture, the second mixture, and the third mixture comprises utilizing a kneader, a Banbury mixer or a twin screw extruder.

* * * * *